US009554326B2

United States Patent
Ryu et al.

(10) Patent No.: US 9,554,326 B2
(45) Date of Patent: Jan. 24, 2017

(54) ACTIVE SCANNING METHOD AND DEVICE

(71) Applicant: LG ELECTRONICS INC., Seoul (KR)

(72) Inventors: Kiseon Ryu, Anyang-si (KR); Giwon Park, Anyang-si (KR); Jinsam Kwak, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 14/389,663

(22) PCT Filed: Apr. 12, 2013

(86) PCT No.: PCT/KR2013/003097
§ 371 (c)(1),
(2) Date: Sep. 30, 2014

(87) PCT Pub. No.: WO2013/154389
PCT Pub. Date: Oct. 17, 2013

(65) Prior Publication Data
US 2015/0304940 A1    Oct. 22, 2015

Related U.S. Application Data

(60) Provisional application No. 61/623,541, filed on Apr. 12, 2012, provisional application No. 61/643,864, filed on May 7, 2012.

(51) Int. Cl.
*H04W 4/00*    (2009.01)
*H04W 48/16*   (2009.01)
(Continued)

(52) U.S. Cl.
CPC ............. *H04W 48/16* (2013.01); *H04W 8/005* (2013.01); *H04W 84/12* (2013.01)

(58) Field of Classification Search
None
See application file for complete search history.

(56) References Cited

U.S. PATENT DOCUMENTS

2005/0047371 A1* 3/2005 Bennett ............. H04W 36/0083
                                                    370/331
2006/0057964 A1* 3/2006 Roy ..................... H04B 7/0408
                                                    455/67.11

(Continued)

FOREIGN PATENT DOCUMENTS

JP    2011-250158    12/2011

OTHER PUBLICATIONS

Kwak, et al., "Reducing the Channel Scanning Latency for Intermittently Connected IEEE 802.11 Networks in Vehicular Environments," IEEE 2008, 6 pages.

(Continued)

*Primary Examiner* — Michael J Moore, Jr.
(74) *Attorney, Agent, or Firm* — Lee Hong Degerman Kang & Waimey

(57) ABSTRACT

Disclosed are an active scanning method and an active scanning device. The active scanning method in a wireless LAN comprises the steps of: a second station (STA) receiving a first probe request frame which has been broadcast by a first STA; and the second STA broadcasting a second probe request frame. The second probe request frame may include a probe request frame detection field, and the probe request frame detection field may indicate that the second STA has received the first probe request frame. Accordingly, a probe response frame is broadcast to a plurality of STAs, thus simplifying a scanning procedure.

8 Claims, 12 Drawing Sheets

(51) Int. Cl.
*H04W 8/00* (2009.01)
*H04W 84/12* (2009.01)

(56) References Cited

U.S. PATENT DOCUMENTS

| | | | | |
|---|---|---|---|---|
| 2006/0111103 A1* | 5/2006 | Jeong | ............ | H04W 48/14 455/434 |
| 2006/0159041 A1* | 7/2006 | Zhun | ............ | H04W 74/0808 370/328 |
| 2006/0221919 A1* | 10/2006 | McRae | ............ | H04W 48/16 370/338 |
| 2007/0008922 A1* | 1/2007 | Abhishek | ............ | H04W 72/02 370/329 |
| 2009/0245133 A1* | 10/2009 | Gupta | ............ | H04W 48/14 370/254 |
| 2010/0020746 A1* | 1/2010 | Zaks | ............ | G06Q 30/02 370/328 |
| 2010/0091732 A1* | 4/2010 | Roeder | ............ | H04W 36/0033 370/331 |
| 2010/0103844 A1* | 4/2010 | Kim | ............ | H04W 48/16 370/254 |
| 2010/0165910 A1* | 7/2010 | Mathews | ............ | H04B 7/15528 370/315 |
| 2013/0094484 A1* | 4/2013 | Kneckt | ............ | H04W 4/02 370/338 |
| 2013/0155933 A1* | 6/2013 | Kneckt | ............ | H04W 74/002 370/312 |
| 2013/0170432 A1* | 7/2013 | O'Brien | ............ | H04W 4/06 370/328 |
| 2013/0182611 A1* | 7/2013 | Kneckt | ............ | H04W 8/005 370/255 |
| 2014/0242985 A1* | 8/2014 | Kneckt | ............ | H04W 48/16 455/434 |
| 2015/0016303 A1* | 1/2015 | Park | ............ | H04W 48/16 370/254 |

OTHER PUBLICATIONS

Kneckt, et al., "Active Scanning Enabling FILS: IEEE P802.11 Wireless LANs," doc.: IEEE 802.11-11/1619r3, Jan. 2009, 16 pages.

PCT International Application No. PCT/KR2013/003097, Written Opinion of the International Searching Authority dated Jul. 30, 2013, 1 page.

* cited by examiner

FIG. 1
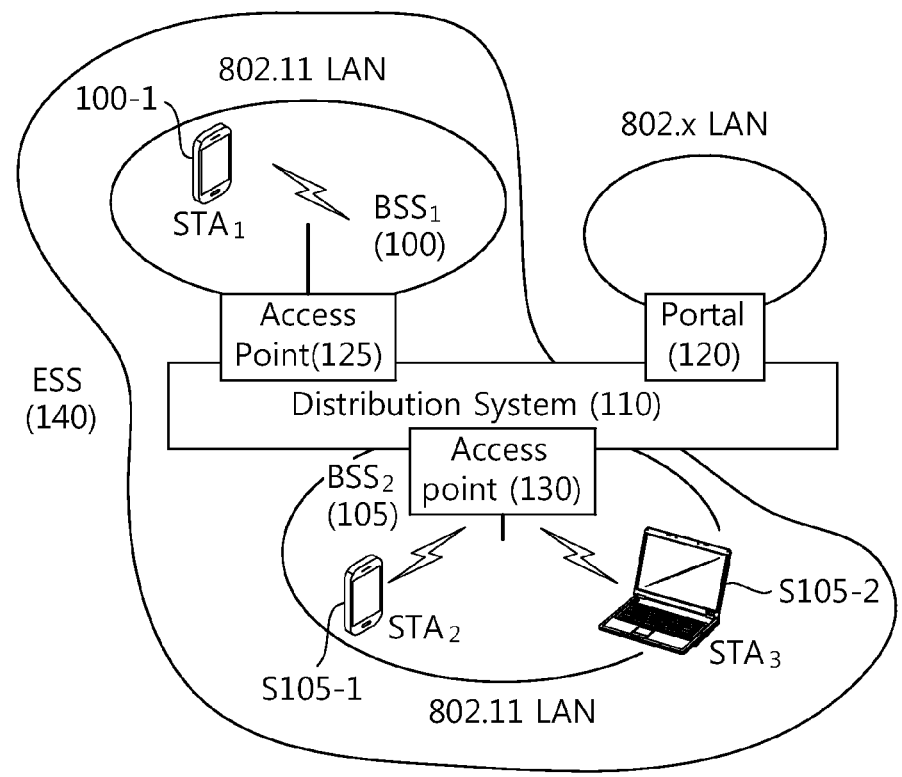
(A)
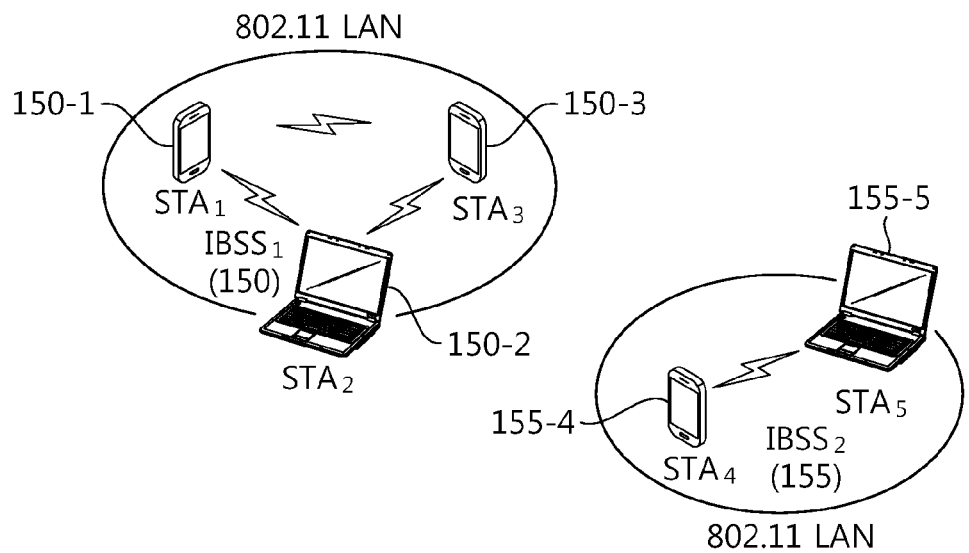
(B)

ACTIVE SCANNING METHOD AND DEVICE

CROSS-REFERENCE TO RELATED APPLICATIONS

This application is the National Stage filing under 35 U.S.C. 371 of International Application No. PCT/KR2013/003097, filed on Apr. 12, 2013, which claims the benefit of U.S. Provisional Application Ser. No. 61/623,541, filed on Apr. 12, 2012 and 61/643,864, filed on May 7, 2012, the contents of which are all hereby incorporated by reference herein in their entirety.

BACKGROUND OF THE INVENTION

Field of the invention

The present invention relates to a scanning method and apparatus by an STA (station), and more specifically, to a method of performing active scanning by an STA and a method thereof.

Related Art

Recent wireless LAN techniques are evolving typically in three directions. In line with the existing wireless LAN evolution, an effort to further increase transmission speed includes IEEE (institute of electrical and electronic engineers) 802.11 ac and IEEE 802.11 ad. IEEE 802.11ad is a wireless LAN technique that adopts a 60 GH band. Further, as allowing for broader coverage of transmission than the existing wireless LAN, broadband wireless LAN utilizing a frequency band of 1 GHz or less nowadays gains popularity, which includes IEEE 802.11af utilizing the TVWS (TV white space) band and IEEE 802.11ah utilizing a 900 MHz band. These are primarily targeted for expansion of extended range Wi-Fi services as well as smart grid or broad area sensor networks. Further, the existing WLAN MAC (medium access control) techniques suffer from the problem that the initial link setup time is increased in some cases. To address such problem to allow an STA to quickly access an AP, there are rigorous activities for IEEE 802.11 ai standardization.

IEEE 802.11ai is an MAC technique that treats a swift authentication procedure to significantly save WLAN initial setup and association times and its standardization by a normal task group dates back January, 2011. For the purpose of a quick access procedure, IEEE 802.11ai is in discussion for process simplification in light of AP discovery, network discovery, TSF (time synchronization function) synchronization, authentication & association, process merge with higher layers, etc. Among them, ideas such as process merge utilizing piggyback of DHCP (dynamic host configuration protocol), optimization of the full EAP (extensible authentication protocol) using concurrent IP, and efficient selective AP (access point) scanning are being actively discussed.

SUMMARY OF THE INVENTION

An object of the present invention is to provide an active scanning method by an STA (station).

Another object of the present invention is to provide an apparatus of performing an active scanning method by an STA (station).

To achieve the above objects of the present invention, according to an aspect of the present invention, an active scanning method in a wireless LAN may comprise receiving a first probe request frame broadcast from a first STA (station) by a second STA; and broadcasting a second probe request frame by the second STA, in which the second probe request frame may include a probe request frame detection field, and the probe request frame detection field may indicate that the second STA has received the first probe request frame. The second probe request frame further may include information on an identifier of the first STA. The active scanning method may further comprise receiving a beacon frame or a probe response frame, which is a response to the second probe request frame, from the AP (access point) by the second STA. When the same information should be transmitted to the first STA and the second STA as a response to the first probe request frame and the second probe request frame, the AP broadcasts the probe response frame. When the same information should be transmitted to the first STA and the second STA as a response to the first probe request frame and the second probe request frame and when a transmission time of the beacon frame comes back within a time of monitoring the probe response frame by the first STA and the second STA, the AP broadcasts the beacon frame, and when the same information should be transmitted to the first STA and the second STA as a response to the first probe request frame and the second probe request frame and unless a transmission time of the beacon frame comes back within a time of monitoring the probe response frame by the first STA and the second STA, the AP broadcasts the probe response frame. The first STA sets a probe timer as a maximum channel time when receiving the second probe request frame from the second STA, and in which the probe timer determines whether to shift a channel scanned by the first STA based on the set time.

To achieve the above objects of the present invention, according to another aspect of the present invention, a wireless LAN device comprises a processor, and the processor may be configured so that a first probe request frame broadcast from a first STA (station) is received by a second STA, and the second STA broadcasts a second probe request frame, and in which the second probe request frame may include a probe request frame detection field, and the probe request frame detection field indicates that the second STA has received the first probe request frame. The second probe request frame further may include information on an identifier of the first STA. The processor is configured so that the second STA receives a beacon frame or a probe response frame, which is a response to the second probe request frame, from an AP (access point). When the same information should be transmitted to the first STA and the second STA as a response to the first probe request frame and the second probe request frame, the AP broadcasts the probe response frame. When the same information should be transmitted to the first STA and the second STA as a response to the first probe request frame and the second probe request frame and when a transmission time of the beacon frame comes back within a time of monitoring the probe response frame by the first STA and the second STA, the AP broadcasts the beacon frame, and when the same information should be transmitted to the first STA and the second STA as a response to the first probe request frame and the second probe request frame and unless a transmission time of the beacon frame comes back within a time of monitoring the probe response frame by the first STA and the second STA, the AP broadcasts the probe response frame. The first STA sets a probe timer as a maximum channel time when receiving the second probe request frame from the second STA, and in which the probe timer determines whether to shift a channel scanned by the first STA based on the set time.

A probe response frame may be broadcast to a plurality of STAs (stations), thus simplifying the scanning procedure.

BRIEF DESCRIPTION OF THE DRAWINGS

FIG. 1 is a concept view illustrating the structure of a wireless local area network (WLAN).

DESCRIPTION OF EXEMPLARY EMBODIMENTS

FIG. 1 is a concept view illustrating the structure of a wireless local area network (WLAN).

FIG. 1(A) shows the structure of the IEEE (institute of electrical and electronic engineers) 802.11 infrastructure network.

Referring to FIG. 1(A), the WLAN system may include one or more basic service sets (BSSs, 100 and 105). The BSS 100 or 105 is a set of an AP such as AP (access point) 125 and an STA such as STAT (station) 100-1 that may successfully sync with each other to communicate with each other and is not the concept to indicate a particular area. The BSS 105 may include one AP 130 and one or more connectable STAs 105-1 and 105-2.

The infrastructure BSS may include at least one STA, Aps 125 and 130 providing a distribution service, and a distribution system (DS) 110 connecting multiple Aps.

The distribution system 110 may connect a number of BSSs 100 and 105 to implement an extended service set 140. The ESS 140 may be used as a term to denote one network configured as one or more Aps 125 and 230 are connected via the distribution system 110. The Aps included in one ESS 140 may have the same SSID (service set identification).

The portal 120 may function as a bridge that performs connection the WLAN network (IEEE 802.11) with other network (for example, 802.X).

In the infrastructure network as shown in FIG. 1(A), networks may be implemented between the APs 125 and 130 and between the APs 125 and 130 and the STAs 100-1, 105-1, and 105-2. However, without the APs 125 and 130, a network may be established between the STAs to perform communication. The network that is established between the STAs without the APs 125 and 130 to perform communication is defined as ad-hoc network or independent BSS (basic service set).

FIG. 1(B) is a concept view illustrating an independent BSS.

Referring to FIG. 1(B), the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all the STAs 150-1, 150-2, 150-3, 155-1, and 15502 may be mobile STAs, and access to the distribution system is not allowed so that the IBSS is a self-contained network.

The STA is some functional medium that includes the medium access control (MAC) following the IEEE (Institute of Electrical and Electronics Engineers) 802.11 standards and the physical layer interface for radio media and may be generally used as the concept including both AP and non-AP STA (station).

The STA may be referred to by various terms such as mobile terminal, wireless device, wireless transmit/receive unit (WTRU), user equipment (UE), mobile station (MS), mobile subscriber unit, or simply user.

Figure 2:
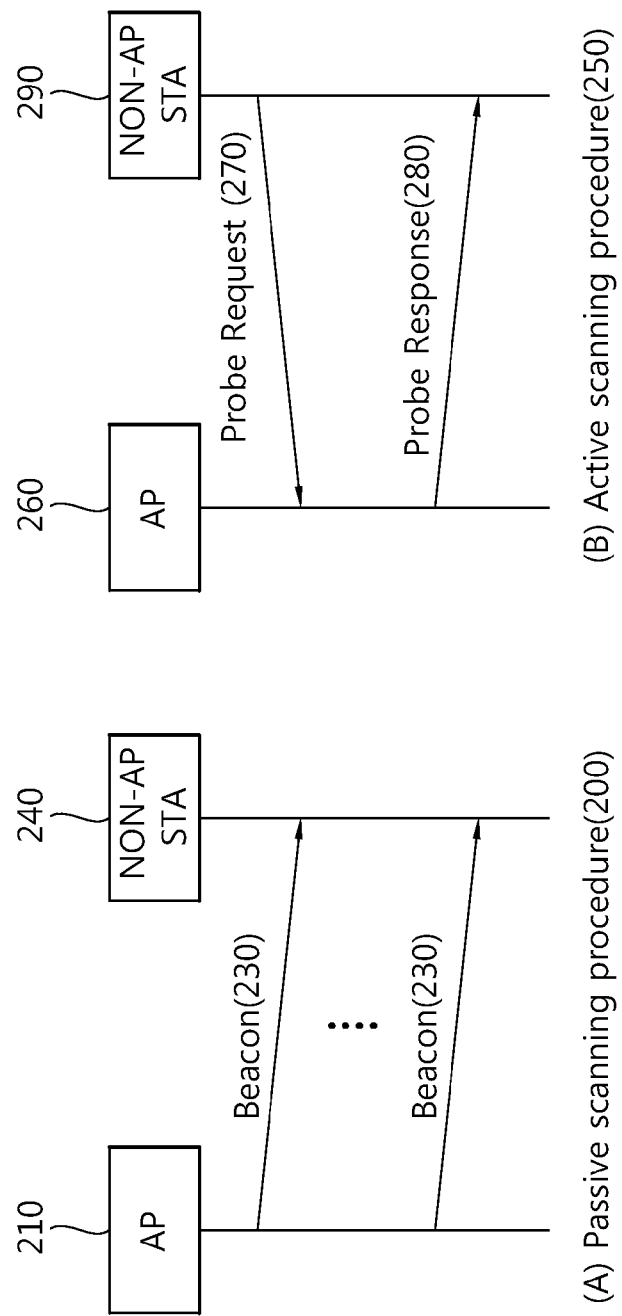
FIG. 2 is a concept view illustrating a scanning method in WLAN.

FIG. 2 is a concept view illustrating a scanning method in a WLAN.

Referring to FIG. 2, the scanning method may be divided into passive scanning 200 and active scanning 250.

Referring to FIG. 2(A), the passive scanning 200 may be performed by a beacon frame 230 that is periodically broadcast from the AP 200. The AP 200 in the WLAN broadcasts the beacon frame 230 to the non-AP STA 240 at a particular period (e.g., per 100 msec). The beacon frame 230 may contain information on the current network. The non-AP STA 240 may perform scanning on the channel and the AP 210 to perform the authentication/association process by receiving the beacon frame 230 periodically broadcast to receive network information.

The passive scanning method 200 receives only the beacon frame 230 transmitted from the AP 210 without the need for the non-AP STA 240 to transmit a frame. Accordingly, the passive scanning 200 is advantageous of reduced entire overhead that is created upon data transmission/reception over the network. However, since the scanning cannot but be passively performed in proportion to the period of the beacon frame 230, the time taken to perform scanning may be increased.

Referring to FIG. 2(B), the active scanning 250 refers to a method in which the non-AP STA 290 leads scanning by transmitting a probe request frame 270 to the AP 260.

After receiving the probe request frame 270 from the non-AP STA 290, the AP 260 may wait a random time to prevent frame collision and then includes network information in a frame response frame 280, then sending the same to the non-AP STA 290. The non-AP STA 290 may obtain the network information based on the received probe response frame 280 and may pause the scanning process.

The active scanning 250 lets the non-AP STA 290 play a leading role in the scanning and thus is advantageous of a short scanning time. However, the non-AP STA 290 should transmit the probe request frame 270, resulting in an increase in the network overhead for frame transmission and reception. The probe request frame 270 is set forth in IEEE 802.11 Ch. 8.3.3.9, and the probe response frame 280 is set forth in IEEE 802.11 Ch. 8.3.3.10.

After the scanning, the AP and the STA may conduct the authentication and association procedures.

Figure 3:
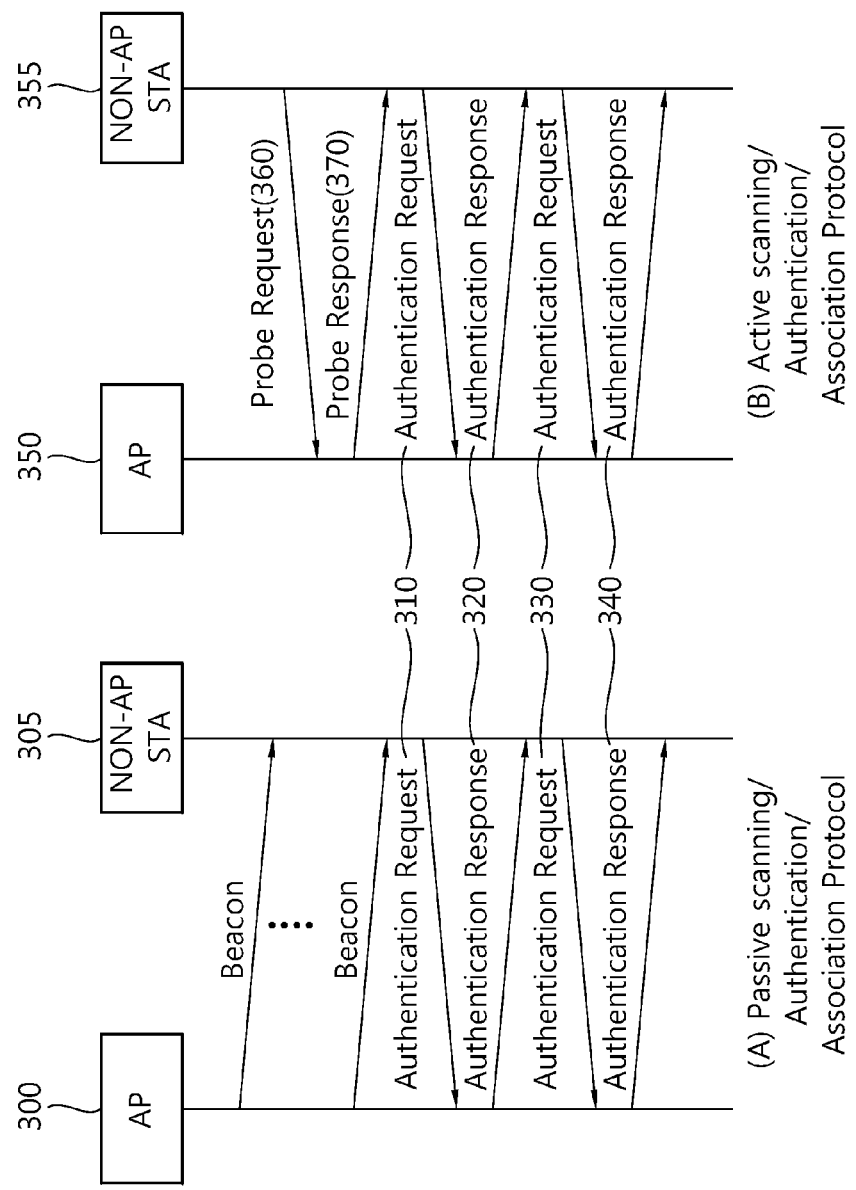
FIG. 3 is a concept view illustrating authentication and association processes after scanning by an AP and an STA.

FIG. 3 is a concept view illustrating an authentication and association process after scanning, which is performed by an AP and an STA.

Referring to FIG. 3, after passive/active scanning, the authentication and association may be conducted with one of the scanned APs.

The authentication and association process may be carried out by way of, e.g., 2-way handshaking FIG. 3(A) is a concept view illustrating the authentication and association process after passive scanning, and FIG. 3(B) is a concept view illustrating an authentication and association after active scanning.

The authentication and association may be equally performed by exchanging an authentication request frame 310/authentication response frame 320 and an association request frame 330/association response frame 340 between the AP 300 or 350 and the non-AP STA 305 or 355 regardless of which one of the active scanning method and the passive scanning method has been used.

The authentication process may be conducted by transmitting the authentication request frame 310 from the non-AP STA 305 or 355 to the AP 300 or 350. In response to the authentication request frame 310, the authentication response frame 320 may be transmitted from the AP 300 or 350 to the non-AP STA 305 or 355. The authentication frame format is set forth in IEEE 802.11 Ch. 8.3.3.11.

The association process may be performed by transmitting the association request frame 330 from the non-AP STA 305 or 355 to the AP 300 or 305. In response to the association request frame 330, the association response frame 340 may be transmitted from the AP 305 or 355 to the non-AP STA 300 or 350. The transmitted association request frame 330 contains information on the capability of the non-AP STA 305 or 355. Based on the information on the capability of the non-AP STA 305 or 355, the AP 300 or 350 may determine whether it is possible to support the non-AP STA 305 or 355. In case the support is possible, the AP 300 or 350 may include in the association response frame 340 whether to accept the association request frame 340 and its reason and its supportable capability information and send the same to the non-AP STA 305 or 355. The association frame format is set forth in IEEE 802.11 Chs. 8.3.3.5/8.3.3.6.

After the association step is performed, normal data transmission and reception is carried out. Unless the association is performed, the association is re-performed based on the cause of not performing the association or association to other AP may be performed.

Figure 4:
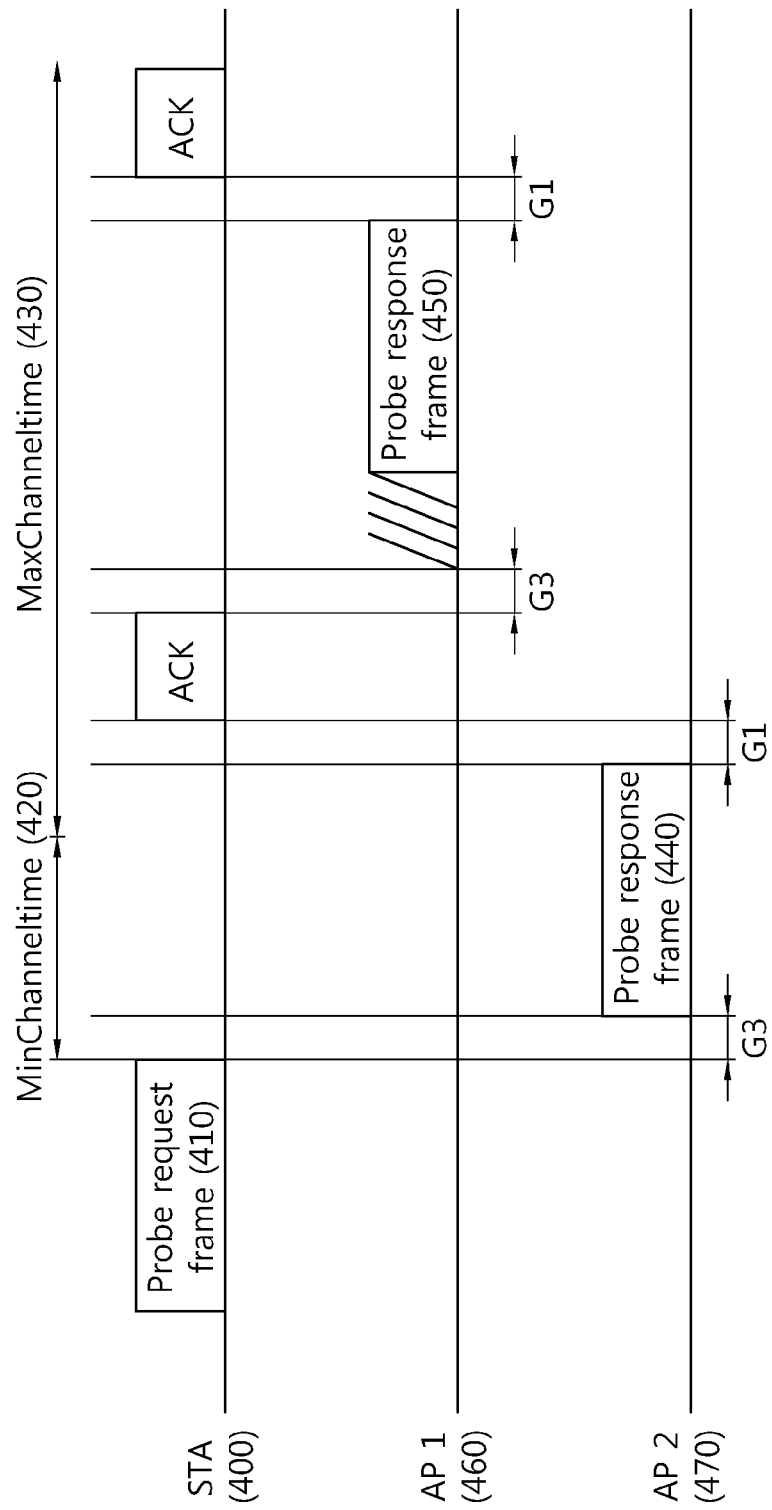
FIG. 4 is a concept view illustrating an active scanning procedure.

FIG. 4 is a concept view illustrating an active scanning procedure.

Referring to FIG. 4, the active scanning procedure may be performed in the following steps.

(1) It is determined whether the STA 400 is ready to perform the scanning procedure.

The STA 400 may wait, e.g., until the probe delay time expires or particular signaling information (for example, PHY-RXSTART.indication primitive) is received to perform active scanning.

The probe delay time is a delay that occurs before the STA 400 sends a probe request frame 410 when performing active scanning PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 400 may transmit the probe request frame 410 to the APs 460 and 470 using a basic access method.

(3) Information for specifying the APs 460 and 470 included in MLME-SCAN.request primitive (for example, SSID (service set identification) 및 BSSID (basic service set identification) information) in the probe request frame 410 and transmit the same.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 400 may specify an AP based on the information to specify the APs 460 and 470 included by MLME-SCAN.request primitive. The specified APs 460 and 470 may send the probe response frames 450 and 450 to the STA 400. The STA 400 may include the SSID and BSSID information in the probe request frame 410 and send the same to unicast, multicast, or broadcast the probe request frame 410. A method of unicasting, multicasting, or broadcasting the probe request frame 410 using the SSID and BSSID information is further described with reference to FIG. 4.

For example, in case an SSID list is included in MLME-SCAN.request primitive, the STA 400 may include the SSID list in the probe request frame 410 and transmit the same. The APs 460 and 470 may receive the probe request frame 410, determine the SSIDs included in the SSID list contained in the received probe request frame 410, and determine whether to send the probe response frames 450 and 450 to the STA 200.

(4) A probe timer is initialized as 0 and is then operated.

The probe timer may be used to check a minimum channel time (MinChanneltime, 420) and a maximum channel time (MaxChanneltime, 430). The minimum channel time 420 and the maximum channel time 430 may be used to control the active scanning operation of the STA 400.

The minimum channel time 420 may be used to perform the operation for varying the channel for conducting active scanning. For example, in case the STA 400 fails to receive the probe response frames 450 and 450 until the minimum channel time 420, the STA 400 shifts scanning channels to perform scanning at other channel. In case the STA 400 receives the probe response frame 450 until the minimum channel time 420, it may process the probe response frames 450 and 450 that are received after waiting until the maximum channel time 430.

The STA 400 may detect PHY-CCA.indication primitive until the probe timer reaches the minimum channel time 420 and may determine whether other frame (for example, probe response frames 450 and 450) has been received by the STA 400 until before the minimum channel time 420.

PHY-CCA.indication primitive may transmit information on the state of the medium from the physical layer to the MAC layer. PHY-CCA.indication primitive may indicate the state of the current channel using channel state parameters such as busy when the channel is unavailable and idle when the channel is available. The STA 400 may determine that there are probe response frames 450 and 450 received by the STA 400 when PHY-CCA.indication is detected to be busy and may determine that there are no probe response frames 450 and 450 received by the STA 400 when PHY-CCA.indication is detected to be idle.

In case PHY-CCA.indication is detected to be idle, the STA 400 may set an NAV (net allocation vector) as 0 and scan a next channel. In case PHY-CCA.indication is detected to be busy, the STA 400 may perform a process on the probe response frames 450 and 450 received after the probe timer reaches the maximum channel time 430. After process on the received probe response frames 450 and 450, the STA 400 may set the NAV (net allocation vector) as 0 and then scan a next channel.

Hereinafter, in embodiments of the present invention, determining whether there are probe response frames 450 and 450 received by the STA 400 may include meaning that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 400 uses the active scanning method, it should perform monitoring to determine whether the parameter of PHY-CCA.indication is busy until the probe timer reaches the minimum channel time.

Figure 5:
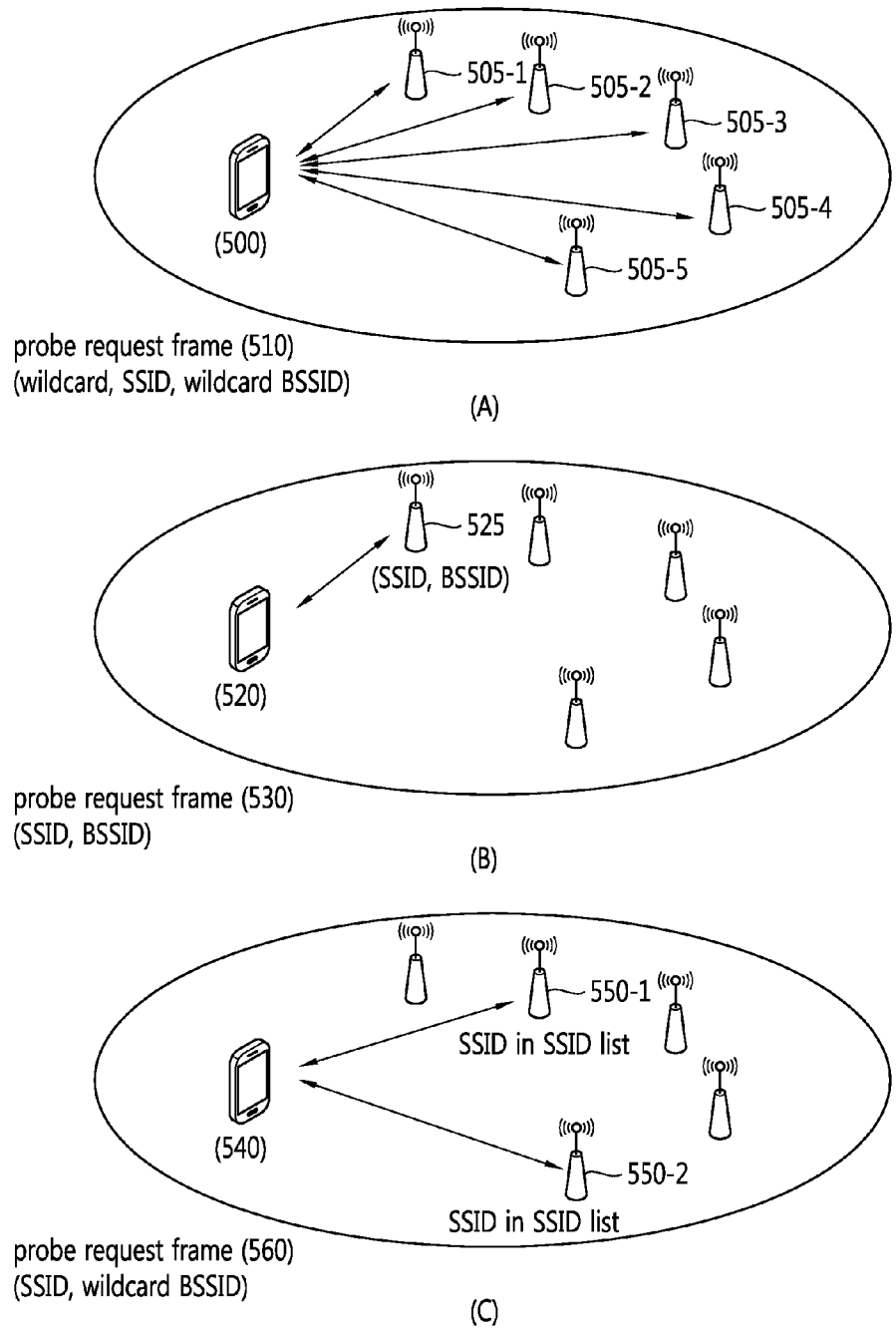
FIG. 5 is a concept view illustrating a method of transmitting a probe request frame.

FIG. 5 is a concept view illustrating a probe request frame transmission method.

FIG. 5 discloses methods in which an STA broadcasts, multicasts, and unicasts a probe request frame.

FIG. 5(A) shows a method in which the STA 500 broadcasts the probe request frame 510.

The STA 500 may include a wildcard SSID and a wildcard BSSID in the probe request frame 510 and broadcast the probe request frame 510.

The wildcard SSID and the wildcard BSSID may be used as identifiers to indicate all of the APs 505-1, 505-2, 505-3, 505-4, and 505-5 included in the transmission range of the STA 500.

In case the STA 500 transmits the probe request frame 510 with the wildcard SSID and the wildcard BSSID included in the probe request frame 510, the APs 505-1, 505-2, 505-3, 505-4, and 505-5 that have received the probe request frame 510 from the STA 500 may send a probe response frame to the STA 500 in response to the received probe request frame.

In case the APs 505-1, 505-2, 505-3, 505-4, and 505-5 that have received the broadcast probe request frame 510 send the probe response frame to the STA 500 in response to the received probe request frame 510 within a constant time, the problem may occur that the STA 500 should receive and process too many probe response frames at once.

FIG. 5(B) shows a method in which the STA 520 unicasts the probe request frame 530.

Referring to FIG. 5(B), in case the STA 520 unicasts the probe request frame 530, the STA 520 may transmit the probe request frame 530 containing particular SSID/BSSID information of the AP. Among the APs that receive the probe request frame 530, only the AP 525 corresponding to the SSID/BSSID specified by the STA 520 may transmit a probe response frame to the STA 520.

FIG. 5(C) shows a method in which the STA 540 multicasts the probe request frame 560.

Referring to FIG. 5(C), the STA 540 may include an SSID list and a wildcard BSSID in the probe request frame 560 and transmit the same. Among the APs receiving the probe request frame 560, the APs 550-1 and 550-2 corresponding to the SSIDs included in the SSID list contained in the probe request frame may transmit a probe response frame to the STA 540.

In the existing active scanning method, when a plurality of STAs transmit a probe request frame to the AP, the AP should transmit a probe response frame to each STA. In the active scanning procedure, when the AP should use a method of broadcasting probe response frames to the plurality of STAs rather than transmitting a probe response frame to each of the STAs, the active scanning procedure between the STAs and the AP may be simplified. Hereinafter, there is disclosed a method of broadcasting probe response frame from an AP to a plurality of STAs according to an embodiment of the present invention.

Hereinafter, as disclosed in an embodiment of the present invention, the AP may be referred to as an FILS (fast initial link setup)-capable AP, and the STA may be referred to as an FILS (fast initial link setup)-capable STA.

According to an embodiment of the present invention, an AP may receive probe request frames from a plurality of STAs, and in response thereto, may broadcast probe response frames to the plurality of STAs.

An STA that performs active scanning may set the probe timer as '0' after transmitting a probe request frame. The STA, when receiving other frame (for example, a probe response frame) before the probe timer reaches the minimum channel time (MinChannelTime), may perform active scanning until the probe timer reaches the maximum channel time (MaxChannelTime).

That is, in case the STA fails to detect PHY-CCA.indication indicated as 'busy' before the minimum channel time expires, the STA may change the scanning channel to other channel and may perform active scanning.

According to an embodiment of the present invention, the AP may transmit a probe response frame to an STA by broadcasting the probe response frame. In such case, the AP should broadcast the probe response frame before the STA that has sent the probe request frame changes the scanning channel to other channel.

Figure 6:
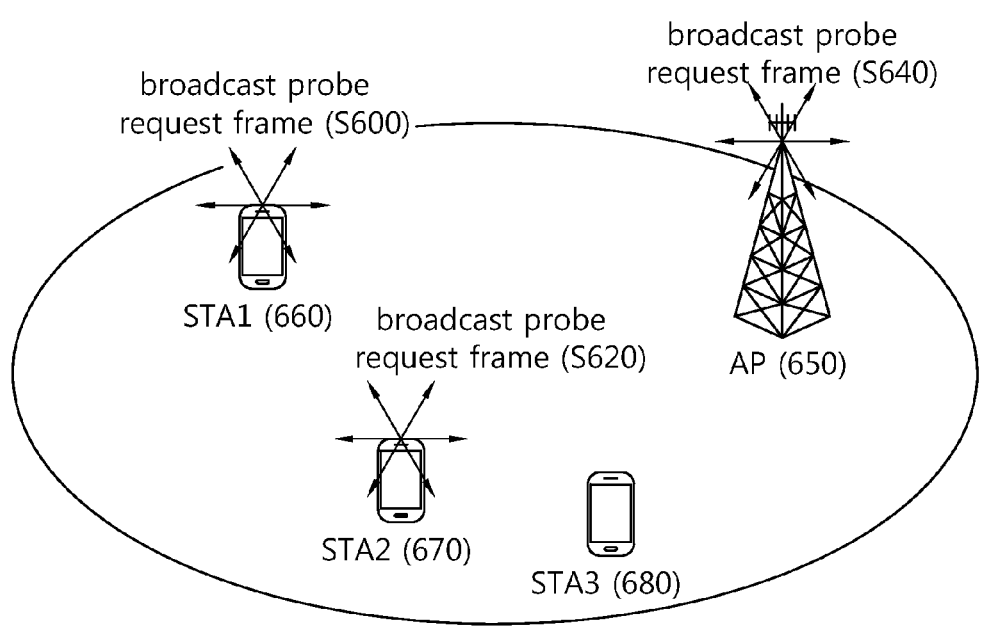
FIG. 6 is a concept view illustrating an active scanning method according to an embodiment of the present invention.

FIG. 6 is a concept view illustrating an active scanning method according to an embodiment of the present invention.

It is assumed in FIG. 6 that in the BSS having one AP 650, a first STA 660, a second STA 670, and a third STA 680, the first STA 660 first broadcasts a probe request frame, and the second STA 670 then broadcasts a probe request frame.

1) The first STA 660 broadcasts a probe request frame (step S600).

The first STA 660 may broadcast a probe request frame. The probe request frame broadcast by the first STA 660 may be received by at least one of the second STA 670, the third STA 680, and the AP 650. In case the AP 650 fails to receive the probe request frame broadcast by the first STA 660, the second STA 670 or the third STA 680 may receive the probe request frame broadcast by the first STA 660.

According to an embodiment of the present invention, the AP 650 broadcasts probe response frames to the plurality of STAs 660, 670, and 680. Even when the AP 650 fails to directly receive the probe request frame from the first STA 660, the AP 650 may be aware based on the probe request frame received from the second STA 670 that the first STA 660 has broadcast the probe request frame. In such case, the AP 650 may broadcast probe response frames so that the first STA 660 and the second STA 670 may receive the probe response frames transmitted from the AP 650 to perform scanning. This is described below in greater detail.

2) The second STA 670 broadcasts a probe request frame (step S620).

Before the second STA 670 broadcasts the probe request frame, the second STA 670 should explore whether the medium is idle during a particular time interval (for example, probe delay, DIFS (distributed coordination function interframe space, etc.). In case the medium is 'busy,' the second STA 670 may perform a back-off operation before transmitting a probe request frame.

The second STA 670 may receive the probe request frame broadcast by the first STA 660 through step S600 before broadcasting the probe request frame. In such case, the probe request frame broadcast from the second STA 670 may contain information indicating that the second STA 670 has received the probe request frame broadcast from the first STA 660. The information indicating that the probe request frame broadcast from the first STA 660 has been received may be defined as a field, e.g., a probe request frame detection field, and may be included in the probe request frame.

The probe request frame detection field may include, e.g., the identifier information of the STA that has transmitted the probe request frame so that the AP may generate a probe response frame based on the identifier information to broadcast. As another example, the probe request frame detection field may be used to indicate, as flag information, only information on whether the probe request frame has been received from other STA. The probe request frame detection field has a single information format and the same information may be defined in various types of information formats and may be transmitted.

The first STA 660 may receive the probe request frame broadcast from the second STA 670 to reset the probe timer as the maximum channel time. In case the first STA 660 receives the probe request frame broadcast from the second STA 670, PHY-CCA.indication primitive is measured as 'busy' in the first STA 660. In such case, the first STA 660 may reset the probe timer as the maximum channel time.

3) The AP 650 broadcasts a probe response frame (step S640).

The AP 650 may receive probe request frames from both the first STA 660 and the second STA 670 or when failing to receive a probe request frame from the first STA 660, may receive a probe request frame only from the second STA 670.

According to an embodiment of the present invention, even when the AP 650 receives a probe request frame only from the second STA 670 without receiving a probe request frame from the first STA 660, the AP 650 may determine whether to broadcast a probe response frame. The probe request frame transmitted from the second STA 670 may include a probe request frame detection field. The AP 650 may determine whether other STA (e.g., the first STA 660) than the second STA 670 has broadcast a probe request frame based on the probe request frame detection field.

The AP 650, even when receiving probe request frames from the first STA 660 and the second STA 670, may determine whether to transmit a probe response frame to the first STA 660 based on the probe request frame detection field in the probe request frame transmitted from the second STA 670. For example, the AP 650 may determine based on the identifier information of the first STA 660 included in the frame detection field whether a probe response frame has been already sent to the first STA 660, and in case no probe response frame has been sent to the first STA 660, may broadcast probe response frames to the first STA 660 and the second STA 670.

Further, the AP 650 may be aware that the first STA 660 would not change channels until the probe timer of the first STA 660 reaches the maximum channel time based on the probe request frame detection field in the probe request frame transmitted from the second STA 670. That is, the AP 650 may be aware that the first STA 660 has reset the probe timer as the maximum channel time due to the probe request frame broadcast from the second STA 670. Accordingly, the AP 650, upon transmitting a probe request frame to the first STA 660 and the second STA 670, may consider the maximum channel time of the first STA 660 and the time until before the probe timer of the second STA 670 expires in broadcasting probe response frames. The probe timer may determine based on the set time whether the STA shifts the channels scanned by the STA.

The third STA 680 might not separately transmit a probe request frame. For example, the third STA 680 may receive probe request frames broadcast from the first STA 660 and the second STA 670. The third STA 680 may be aware that the AP 650 would broadcast a probe response frame based on the probe request frames broadcast from the first STA 660 and the second STA 670. In such case, the third STA 680, rather than separately broadcasting a probe request frame to the AP 650, may receive the probe response frame broadcast from the AP 650 to perform scanning based on the received probe response frame.

In other words, according to the present invention, the second STA 670 may receive the probe request frame broadcast from the first STA 660 before broadcasting a probe request frame. In such case, the second STA 670 may broadcast a probe request frame including information indicating that the first STA 660 has transmitted a probe request frame. The AP 650 may broadcast a probe response frame before the STAs 660 and 670 that have broadcast probe request frames change the scanning channel to other channel. The STAs 606 and 670 may include information on the minimum channel time and the maximum channel time in the probe request frames and transmit the same.

Figure 7:
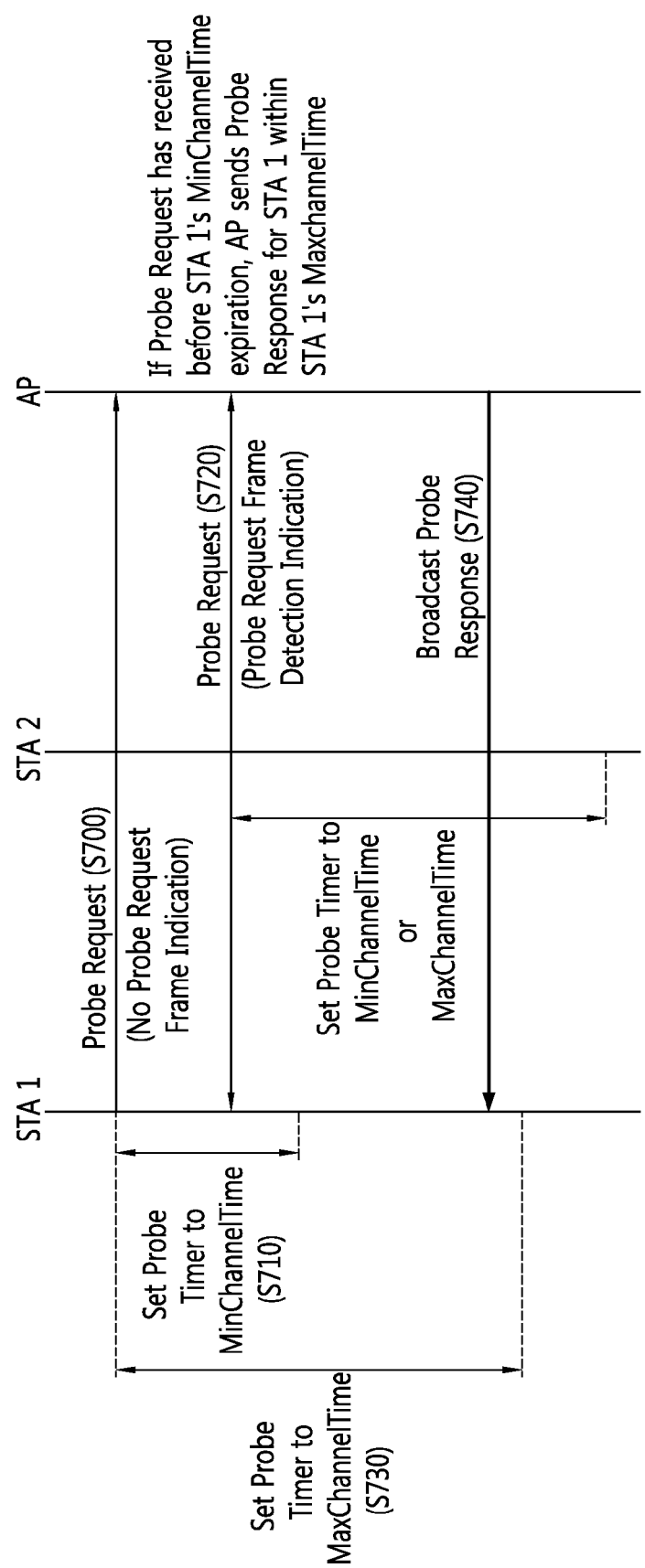
FIG. 7 is a concept view illustrating an active scanning method according to an embodiment of the present invention.

FIG. 7 is a concept view illustrating an active scanning method according to an embodiment of the present invention.

Referring to FIG. 7, (1) the first STA explores whether the medium is idle before transmitting a probe request frame and broadcasts a probe request frame (step S700).

A check on the medium may be conducted during a particular time interval (for example, probe delay, DIFS, etc.). In case the first STA fails to receive a probe request frame broadcast from other STAs during the particular time interval, the first STA may transmit to the AP a probe request frame including information (e.g., no probe request frame indication) indicating that no signal has been detected. For example, the first STA may include in the probe request frame detection field of the probe request frame information indicating that no signal has been detected and may transmit the same.

(2) The first STA sets the probe timer as the minimum channel time (step S710).

The first STA may set the probe timer as the minimum channel time after broadcasting a probe request frame.

(3) In case the second STA detects the probe request frame broadcast from the first STA, the second STA may transmit to the AP a probe request frame including information for indicating that a probe request frame has been received from other STA (step S720).

For example, the second STA may detect whether the medium is idle before transmitting a probe request frame. The second STA may receive a probe request frame from other STA (e.g., the first STA) during a period for detecting the medium. In such case, the second STA may transmit to the AP a probe request frame including information indicating that a probe request frame has been received from other STA. For example, the second STA may include in the probe request frame detection field of the probe request frame information indicating that a probe request frame has been received from other STA and transmit the same.

(4) In case the first STA receives the probe request frame transmitted from the second STA, the first STA may set the probe timer from the minimum channel time to the maximum channel time (step S730).

The first STA, when receiving the probe request frame broadcast from the second STA and PHY-CCA.indication primitive is detected as 'busy,' may reset the minimum channel time to the maximum channel time. That is, the first STA may receive the probe response frame broadcast from the AP for the time set as the maximum channel time.

(5) The AP broadcasts a probe response frame (step S740).

The AP may broadcast a probe response frame before the time set by the first STA and the second STA elapses so that a shift to other channel is made. The first STA and the second STA may receive a probe response frame from the AP. For example, through the above-described procedure, the probe timer of the first STA may be set as the maximum channel time, and the probe timer of the second STA may be set as the minimum channel time. In such case, before the times respectively set in the first STA and the second STA expire, the terminal may broadcast a probe response frame.

Step S740 may apply when the probe request frames transmitted from the plurality of STAs do not include individual request information according to an embodiment of the present invention. In such case, the AP may broadcast a probe response frame without the need of unicasting an individual probe response frame to each STA. Such transmit method by the AP is merely an embodiment, and even in case the probe request frames transmitted from the plurality of STAs include individual request information, if the same information is to be sent to the plurality of STAs, a probe response frame may be broadcast depending on the AP's determination. Further, even when different information is transmitted from the AP to the plurality of STAs, the AP may sometimes broadcast a probe response frame depending on its determination.

That is, according to an embodiment of the present invention, the AP may broadcast a probe response frame to a plurality of STAs without the need of transmitting the probe response frame to each STA by performing a procedure multiple times. Further, even when the AP fails to directly receive a probe request frame from the first STA, the AP may be aware based on the probe request frame from the second STA that other STAs have also sent a probe request frame. Accordingly, the AP may transmit a probe response frame to the STA from which the AP has not directly received a probe request frame.

Figure 8:
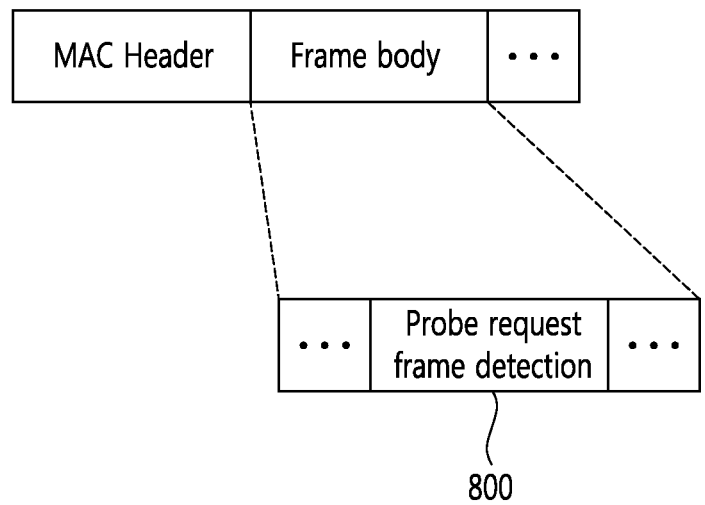
FIG. 8 is a concept view illustrating a probe request frame according to an embodiment of the present invention.

FIG. 8 is a concept view illustrating a probe request frame according to an embodiment of the present invention.

Referring to FIG. 8, the probe request frame may include in a field 800 of the probe request frame information on whether a probe request frame has been transmitted from other STA.

For example, the probe request frame may include a probe request frame detection field 800. The STA may transmit to the AP information on whether there has been a probe request frame transmitted from other STA using the probe request frame detection field 800.

The probe request frame detection field 800 may include various types of information. For example, the probe request frame detection field 800 may include identifier information of the STA that has sent a probe request frame. The AP may include information specific to the corresponding STA in a probe response frame based on the STA's identifier information included in the probe request frame detection field 800 and broadcast the same.

As another example, the probe request frame detection field 800 may be used to indicate, as flag information, only information on whether a probe request frame has been received from other STA. In such case, the AP may determine whether a probe request frame has also been transmitted from other STA and broadcast a probe response frame so that a plurality of STAs may receive the probe response frame.

Figure 9:
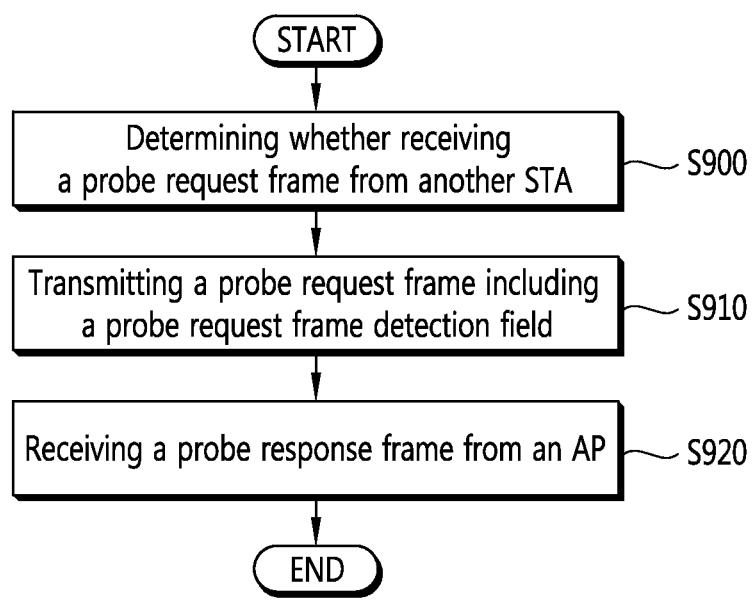
FIG. 9 is a flowchart illustrating a method of performing active scanning according to an embodiment of the present invention.

FIG. 9 is a flowchart illustrating a method of performing active scanning according to an embodiment of the present invention.

Referring to FIG. 9, before a probe request frame is transmitted, it is determined whether there is a probe request frame sent from other STA (step S900).

For example, the STA may determine whether the medium is idle during a particular time interval before sending a probe request frame. At this time, the STA may receive a probe request frame broadcast from other STA. The time period during which the probe request frame is received may be a time period other than the time period during which it is determined whether the medium is idle. For example, in case there is a probe request frame from other STA which the STA has received during a predetermined time period, the STA may include in the probe request frame detection field information indicating that a probe request frame has been received from other STA and transmit the same.

The STA transmits the probe request frame including a probe request frame detection field to the AP (step S910).

In case the STA receives the probe request frame broadcast from other STA, when sending the probe request frame to the AP, the STA may include in the probe request frame detection field information indicating that a probe request frame has been received from other and transmit the same. The probe request frame detection field is an example format including the information indicating that a probe request frame has been received from other STA. The probe request frame detection field may contain identifier information of other STA that has sent a probe request frame, or the probe request frame detection field, as flag information, may be information indicating that a probe request frame has been received from other STA.

A probe response frame is received from the AP (step S920).

The AP may receive the probe request frame transmitted from the STA. Based on the probe request frame detection field included in the probe request frame sent from the STA, a probe response frame may be broadcast to a plurality of STAs. For example, as a result of the AP demodulating the probe request frame, the probe request frame detection field of the probe request frame may include identifier information of other STA. In such case, the AP may broadcast a probe response frame to a plurality of STAs.

Figure 10:
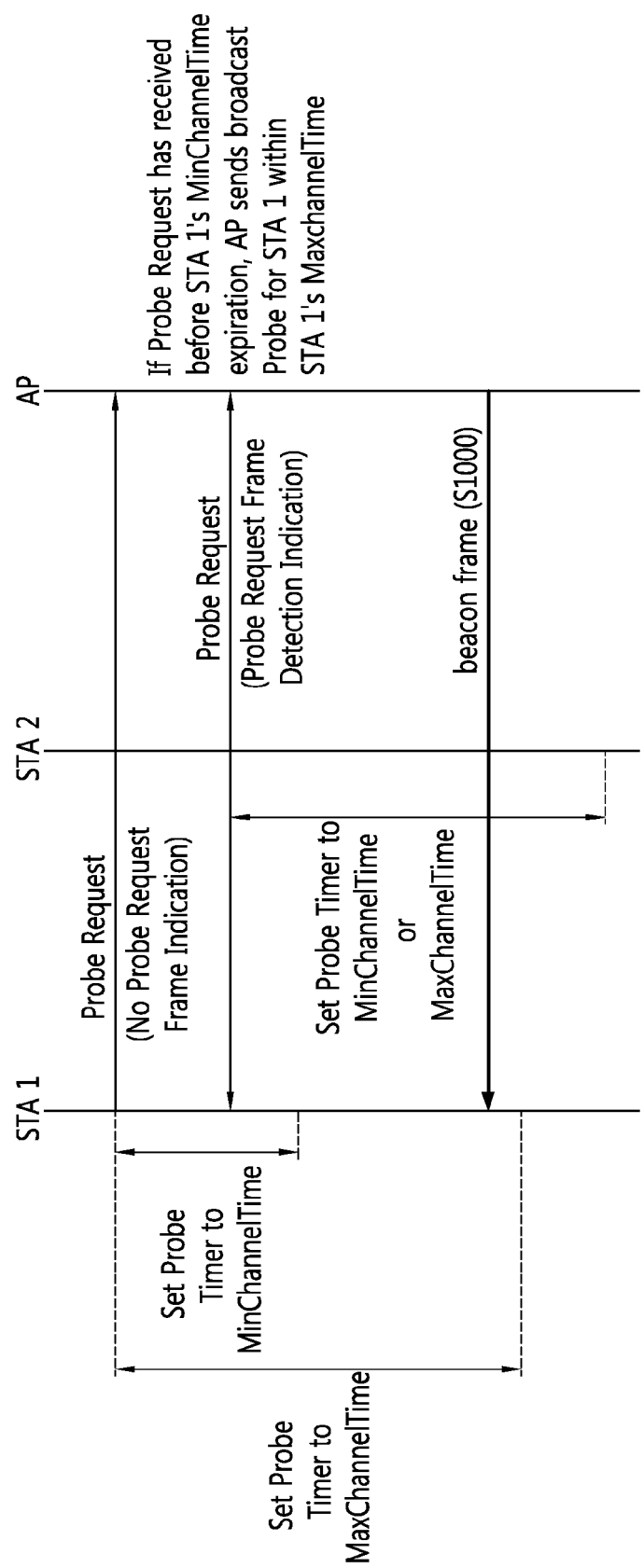
FIG. 10 is a concept view illustrating a scanning method according to an embodiment of the present invention.

FIG. 10 is a concept view illustrating a scanning method according to an embodiment of the present invention.

FIG. 10 shows an example in which the AP broadcasts a beacon frame instead of a probe response frame.

The AP may broadcast a beacon frame instead of a probe response frame, and the STA may perform passive scanning based on the received beacon frame.

The procedure until STA 2 indicates whether other STA has sent a probe request frame based on the probe request frame detection field when transmitting a probe request frame is the same as the process until step S730 as described above.

According to another embodiment of the present invention, the AP may broadcast a beacon frame (step S1000).

The AP, in case the time that the beacon frame is transmitted comes earlier than (is included in) the time that the terminal monitors a probe response frame (for example, the maximum channel time), may broadcast a beacon frame. Unless the transmission time of a beacon frame comes earlier than the time that the terminal monitors a probe response frame, a probe response frame may be transmitted as described above.

As the beacon frame, a short beacon frame obtained by simplifying a regular beacon frame that has been typically used or a regular beacon frame may be used. The short beacon frame may be a frame obtained by removing unnecessary repetitive information from the MAC (medium access control) header of the frame. For example, the short beacon frame might not include information relating to the entire BSS.

For example, the AP, in case the first probe request frame and the second probe request frame do not include individual request information and the transmission time of the beacon frame comes back within the time when STA 1 and STA 2 monitor the probe response frame, may transmit the beacon frame. Unless the transmission time of the beacon frame comes back within the time when STA 1 and STA 2 monitor the probe response frame, the probe response frame may be transmitted. Such transmission method is merely an example, and even when, depending on the AP's determination, the first probe request frame and the second probe request frame contain individual request information, the probe response frame may be broadcast, and such embodiment also belongs to the scope of the present invention.

As shown in FIG. 10, the method of transmitting a beacon frame without broadcasting a probe response frame may apply when a probe response frame is broadcast to a plurality of STAs. For example, in case the probe request frames transmitted from a plurality of STAs do not contain individual request information, the AP may broadcast a probe request frame without the need of unicasting individual probe response frames. In such case, the AP may broadcast a beacon frame instead of a probe response frame.

In case the STA includes individual request information in a probe request frame and sends the same, the AP should transmit to the STA a probe response frame including a response to the individual request information. In such case, the probe response frame may be transmitted. For example, it may be assumed that one of two STAs transmits a probe request frame including individual request information to the AP. In such case, the AP may unicast a probe response frame to the STA that has sent the individual request information while broadcasting a beacon frame to the other STA that has not transmitted individual request information. As described earlier, even when one of two STAs includes individual request information in a probe request frame and transmits the same to the AP, the AP may broadcast a probe response frame depending on its determination, and such embodiment also belongs to the scope of the present invention.

Figure 11:
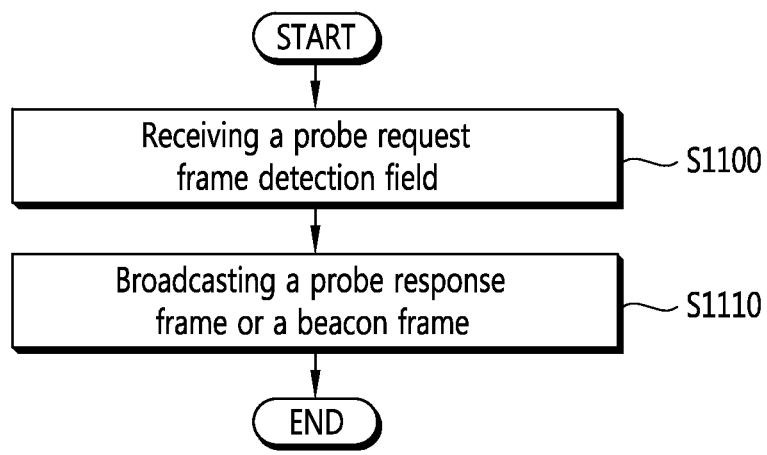
FIG. 11 is a concept view illustrating a method of determining whether an AP transmits a probe response frame according to an embodiment of the present invention.

FIG. 11 is a concept view illustrating a method of determining whether an AP transmits a probe response frame according to an embodiment of the present invention.

Referring to FIG. 11, the AP receives information on a probe request frame detection field included in the probe request frame (step S1100).

The AP may receive a probe request frame from at least one STA as described above. The AP may determine whether other STA than the STA that has sent a probe request frame has transmitted a probe request frame based on a received probe request frame.

A probe response frame or a beacon frame is broadcast (step S1120).

The AP may determine that a plurality of STAs receive the probe request frame based on a result of the determination made in step S1100. In such case, the AP may broadcast a beacon frame or a probe response frame based on the transmission time of the beacon frame.

According to an embodiment of the present invention, in case the time of transmission of a probe response frame to a plurality of STAs overlaps the transmission time of the beacon frame, the AP may be rendered to broadcast a beacon frame instead of a probe response frame. For example, in case the timing when a probe response frame is transmitted overlaps the transmission time of a short beacon frame, the AP may broadcast a short beacon frame instead of a probe response frame. As another example, in case the transmission time of a probe response frame overlaps a TBTT (target beacon transmission time) that is a transmission time of a regular beacon frame, the AP may broadcast a regular beacon frame instead of a probe response frame.

Figure 12:
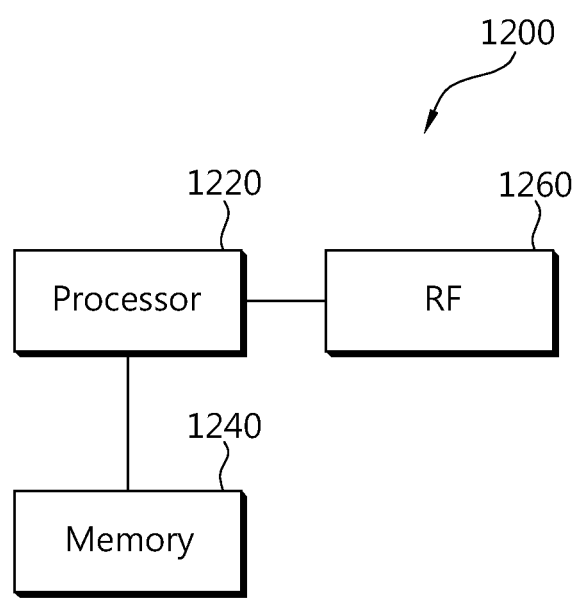
FIG. 12 is a block diagram illustrating a wireless device to which an embodiment of the present invention may apply.

FIG. 12 is a block diagram illustrating a wireless device to which an embodiment of the present invention may apply.

Referring to FIG. 12, the wireless device 1200 is an STA that may implement the above-described embodiments and may be an AP or a non-AP STA (station).

The wireless device 1200 includes a processor 1220, a memory 1240, and an RF (radio frequency) unit 1260.

The RF unit 1260 may be connected with the processor 1220 to transmit/receive radio signals.

The processor 1220 implements functions, processes, and/or methods as proposed herein. For example, the processor 1220 may be implemented to perform an operation of the wireless device according to the above-described embodiments of the present invention.

For example, the processor 1220 may be implemented so that a probe request frame broadcast from other STA is received, and upon broadcasting a probe request frame, an indicator is included indicating that a probe request frame has been received from the other STA. The probe request frame may include a probe request frame detection field as an indicator, and the probe request frame detection field may indicate that a probe request frame has been received from other STA.

Further, the processor 1220 may be implemented so that in case the wireless device is an AP and the transmission time of a beacon frame overlaps the transmission time of the probe response frame, a beacon frame is transmitted and so that in case the transmission time of the beacon frame does not overlap the transmission time of the probe response frame, the probe response frame is transmitted.

The processor 1220 may include an ASIC (application-specific integrated circuit), other chipset, a logic circuit, a data processing device, and/or a converter that converts a base band signal and a radio signal therebetween. The memory 1240 may include an ROM (read-only memory), an RAM (random access memory), a flash memory, a memory card, a storage medium, and/or other storage device. The RF unit 1260 may include one or more antennas that transmit and/or receive radio signals.

When an embodiment is implemented in software, the above-described schemes may be realized in modules (processes, functions, etc.) that perform the above-described operations. The modules may be stored in the memory 1240 and may be executed by the processor 1220. The memory 1240 may be positioned in or outside the processor 1220 and may be connected with the processor 1220 via a known means.

What is claimed is:

1. An active scanning method in a wireless local area network (WLAN), the active scanning method comprising:
   receiving, by a second station (STA), a first probe request frame broadcasted from a first STA;
   broadcasting, by the second STA, a second probe request frame to an AP (access point),
   wherein the second probe request frame includes a probe request frame detection field, and
   wherein the probe request frame detection field indicates that the second STA has received the first probe request frame; and
   receiving, by the second STA, a beacon frame or a probe response frame from the AP, wherein the probe response frame is a response to the second probe request frame, and wherein when the same information should be transmitted to the first STA and the second STA as a response to the first probe request frame and the second probe request frame, the AP broadcasts the probe response frame.

2. The method of claim 1,
   wherein the second probe request frame further includes information on an identifier of the first STA.

3. The method of claim 1,
   wherein when a transmission time of the beacon frame is overlapped with a time of monitoring the probe response frame by the first STA and the second STA, the AP broadcasts the beacon frame, and
   when the transmission time of the beacon frame is not overlapped with the time of monitoring the probe response frame by the first STA and the second STA, the AP broadcasts the probe response frame.

4. The method of claim 3,
   wherein the first STA sets a probe timer as a maximum channel time when the first STA receives the second probe request frame from the second STA, and
   wherein the probe timer determines whether to shift a channel scanned by the first STA based on the maximum channel time.

5. A second STA (station) as a wireless local area network (WLAN) device comprising:
   a radio frequency (RF) unit configured to transmit and receive radio signals; and
   a processor operatively coupled to the RF unit and configured to:
   receive a first probe request frame broadcasted from a first STA,
   broadcast a second probe request frame to an AP (access point),
   wherein the second probe request frame includes a probe request frame detection field, and
   wherein the probe request frame detection field indicates that the second STA has received the first probe request frame, and
   receive a beacon frame or a probe response frame from the AP, wherein the probe response frame is a response to the second probe request frame, and wherein when the same information should be transmitted to the first STA and the second STA as a response to the first probe request frame and the second probe request frame, the AP broadcasts the probe response frame.

6. The second STA of claim 5,
   wherein the second probe request frame further includes information on an identifier of the first STA.

7. The second STA of claim 5,
   wherein when a transmission time of the beacon frame is overlapped with a time of monitoring the probe response frame by the first STA and the second STA, the AP broadcasts the beacon frame, and
   when the transmission time of the beacon frame is not overlapped with the time of monitoring the probe response frame by the first STA and the second STA, the AP broadcasts the probe response frame.

8. The second STA of claim 7,
   wherein the first STA sets a probe timer as a maximum channel time when the first STA receives the second probe request frame from the second STA, and
   wherein the probe timer determines whether to shift a channel scanned by the first STA based on the maximum channel time.

* * * * *